March 24, 1970   W. H. WOOD   3,502,022
PRINTING PROCESS APPLICABLE TO HOT GLASS ARTICLES
Filed Oct. 23, 1965

INVENTOR.
WILLIAM H. WOOD
BY J. R. NELSON &
W. A. SCHAICH
ATTORNEYS

United States Patent Office 3,502,022
Patented Mar. 24, 1970

3,502,022
PRINTING PROCESS APPLICABLE TO
HOT GLASS ARTICLES
William H. Wood, Rockbridge, Ohio, assignor to Owens-Illinois, Inc., a corporation of Ohio
Continuation-in-part of application Ser. No. 242,230, Dec. 4, 1962. This application Oct. 23, 1965, Ser. No. 505,319
Int. Cl. B41m 1/12, 1/34, 1/40
U.S. Cl. 101—129                    7 Claims The present application is a continuation-in-part of U.S. application Ser. No. 242,230, filed Dec. 4, 1962 (now abandoned).

The present invention relates to a method of printing on glass articles and more particularly to printing a label or decoration on a hot glass article by an electrostatic process.

In the decorating of glass with fired-on decorating materials by conventional methods, a colored glass frit is applied to a finished glass article, such as a bottle, tumbler or the like. The article, bearing the decorative frit, is then heated in a lehr to fire or fuse the frit to the glass. The application of the frit to the glass may be accomplished by any of several well known techniques. For example, a silk screen application of the frit in paste form is well known, as is the spraying of a frit suspended in an aqueous vehicle, usually a mixture of water and alcohol.

Common to these various methods is the necessity of completely forming, annealing and inspecting the glass article prior to the initiation of the coating or decorating procedure; then applying the frit to the finished article, and then firing or fusing the frit to the article in a lehr or other heating device. Where more than one color is applied, successive screening operations must be performed for the separate colors, each such screening operation typically being followed by a separate heating step to fix the frit to the glass. Further, in the application of multicolor decorations, extreme care must be exercised in order to obtain accurate registration of the successive colors.

All in all, it will be appreciated that printing on glass in the conventional manner requires a great deal of hand labor, together with the multiple handling of the previously finished glass article during the printing process. When the expense of this labor and handling is added to the necessity of separately heating the printed article in order to fuse or otherwise fix the color to the article, these steps being repeated for each of several colors, the high cost of such decorated articles can be readily appreciated.

In the present invention, the article is printed after its formation but prior to its completion and the printing particles are fused to the article during the performance of the always required heat treating of the article, e.g. annealing, tempering, or combined annealing and tempering. Thus, it is possible to eliminate the expensive hand labor involved in printing, handling the completed glass article before, during and after application of the printing, and to eliminate the necessity for reheating of the glass article in order to fuse or otherwise fix the printing particles to the surface of the article.

The process of the present invention contemplates the application of discrete solid particles in the form of a frit or other fusible essentially glassy material to the surface of a glass article after the article is formed and while the glass is hot, but prior to annealing of the article to its final finished condition. Further, the present invention subjects the frit to an electrical field to electrostatically attract the frit to the glass surface, e.g., to transfer the frit in a configuration or pattern corresponding to the configuration or pattern of the printed image to be applied to the glass surface.

The fact that the glass surface is hot at the time of application of the frit thereto renders the surface sufficiently conductive to electrostatically attract the printing particles to the surface. Further, the fact that the glass surface is hot aids in initially adhering the printing particles to the eliminating the problem of rebound or bouncing of the particles between the two surfaces, i.e., the surface of the glass and the surface of the carrying medium, thereby creating a sharp and distinct image on the glass surface.

After the attraction of the printing particles to the surface and their initial adherence thereto in the predetermined pattern or image configuration desired, the particles are subsequently sufficiently fused to one another and to the glass surface to form a tightly adherent, highly resistant, smooth and preferably nonparticulate image. This fusing step may be carried out in conjunction with the normal annealing operation which must be performed upon the formed glass article. Thus, the final fusion and formation of the image forming particles is obtained at no cost in addition to the cost normally encountered in annealing, tempering, or otherwise heat treating the glass article to remove those strains normally induced or otherwise formed therein during the article-forming operation.

In order to take maximum advantage of the economic potential of the method of the present invention, the desired process of the present invention involves the formation of the glass article by conventional glass-forming techniques, applying the printing particles to the still-hot surface of the glass article by utilization of an electrostatic field followed by subjecting the glass article to a heat treatment which also is sufficient to fuse the printing particles to a final adherent, nonparticulate, resistant state Of course, the advantages of utilizing the electrostatic field in conjunction with the hot surface of a glass article may well justify the expense of reheating the completed article after it has been formed and heat treated, and such a reheating procedure is contemplated by and within the scope of the present invention.

It is, therefore, an important object of the present invention to provide a new and novel method of printing upon the surface of a glass article wherein coating particles are electrostatically attracted to a hot glass surface.

Another important object of the present invention is to provide a method of printing the surface of a glass article wherein solid discrete particles previously formed to a desired configuration or image are electrostatically attracted to a hot glass surface and adhered to the hot surface in the original particle configuration or image.

It is another object of the present invention to provide a process for printing upon the surface of a glass article by electrostatically attracting solid discrete printing particles to the glass surface, the surface being at a temperature at which the glass surface is electrically conductive and is capable of at least partially thermally adhering the particles to the surface and to one another in a predetermined, clear-cut pattern.

Yet another, and no less important, object of the present invention is the provision of a method of forming a decorative or printing image on a glass surface by juxtaposing an electrically-conductive plate having thereon printing particles in a predetermined pattern and a glass surface at an elevated temperature and subjecting the particles to an electrostatic force establishing an electrostatic potential difference between the conductive plate and the article surface to move the particles from the plate to the surface while preserving the predetermined pattern of the particles, contact between the particles and the hot glass surface adhering the particles to the surface to a degree sufficient to preserve the particle pattern.

Other objects of this invention will appear in the following description and appended claims, reference being had to the accompanying drawings forming a part of this specification wherein like reference characters designate corresponding parts in the several views.

Figure 1:
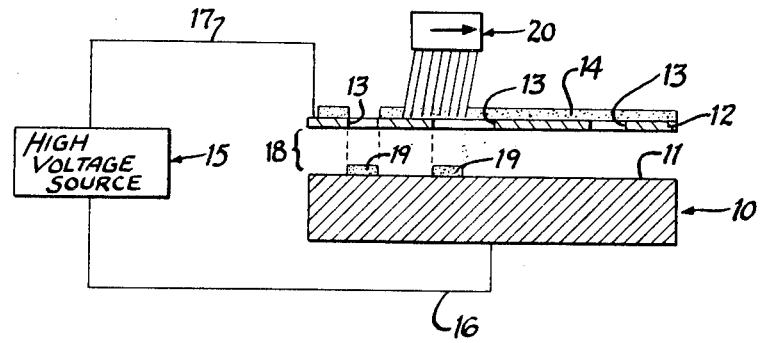
FIGURE 1 is a schematic representation of an apparatus and an electrostatic circuit capable of carrying out the method of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

GENERAL METHOD

As hereinbefore expalined, the present invention proposes the electrostatic attraction to a hot glass surface of printing particles which are then thermally adhered to the article surface and to one another to form the desired printed image. Substantial variations of this basic method are possible, such variations being hereafter described in detail and involving generally variations in the methods of providing the particles in their various patterns prior to their attraction to the hot glass surface, variations in the configuration of the pattern, variations in the method of transferring or otherwise placing the particles upon the hot surface, and variations in the procedural steps involved in placing the particles upon the hot surface. These variables are hereafter discussed in detail under specific headings.

THE GLASS ARTICLE

The glass article to which the particles are electrostatically attracted may be of widely variant composition and configuration. So far as the glass composition is concerned, the method is particularly applicable to glass containers having a theoretical oxide analysis falling within the general limits set forth in Table I as follows:

TABLE I

| Oxide: | Percent by weight |
| --- | --- |
| $SiO_2$ | 60–75 |
| $Al_2O_3$ | 0.1–10 |
| CaO | 6–14 |
| BaO | 0–1.0 |
| $B_2O_3$ | 0–5 |
| MgO | 0–8 |
| $Na_2O$ | 10–20 |
| $K_2O$ | 0–3 |

In addition to this theoretical analysis, the glass preferably includes various colorant ingredients, such as oxides of titanium, copper, cobalt or iron, sodium dichromate, or the like. The compositions of Table I may be generally identified as soda lime, flint glass batches suitable for the manufacture of containers or like articles.

The method may be adapted with equal facility to flat glasses such as window glass, plate glass, laminated or "safety" glass, flat glass or the like or even to optical glasses, devitrifiable glasses or the like. Consequently, the compositions of Table I are exemplary only and are not intended as limiting the compositions of glass articles to which the method is broadly applicable.

A particular container glass falling within the above-identified range of composition of Table I and yielding excellent results when utilized in conjunction with the method of the present invention is set forth in Table II as follows:

TABLE II

| Oxide: | Percent by weight |
| --- | --- |
| $SiO_2$ | 72.1 |
| $Al_2O_3$ | 1.7 |
| CaO | 11.3 |
| MgO | 1.1 |
| $Na_2O$ | 13.3 |
| $K_2O$ | .2 |

It has been found that the electrical conductivity of glass increases with an increase in the temperature of the glass. Table III sets forth the resistance of a container of the composition set forth in Table II, the resistivity being obtained by placing the bottle in a furnace at the various indicated temperatures, fastening a high-voltage terminal onto the lip of the bottle which was placed on its side in contact with a flat ground electrode. The current flow through the bottle at various voltages was measured to determine the resistance.

TABLE III.—RESISTANCE OF BOTTLE AT VARIOUS APPLIED POTENTIALS

[Bottle diameter, 2.72 inches]

| Temperature, °F. | Resistance (megohms) at Indicated Voltage (kilovolts) | | | | | |
| --- | --- | --- | --- | --- | --- | --- |
| | 1 kv. | 2 kv. | 3 kv. | 4 kv. | 5 kv. | 6 kv. |
| 400 | 2,000 | 2,000 | 1,500 | 1,300 | 1,000 | 920 |
| 500 | 1,000 | 500 | 200 | 150 | 130 | 94 |
| 600 | 670 | 80 | 27 | 20 | 16 | 12 |
| 700 | 200 | 24 | 3.8 | | | |
| 800 | 6.7 | 1 | | | | |
| 900 | 0.5 | | | | | |

The decrease in resistance or the increase in conductivity of other glass compositions has been found to be of the same order and roughly proportional to the resistances indicated in Table III.

This conductivity-temperature relationship of the glass article at various temperature levels is of importance to the present method for several reasons, to be hereafter more fully explained. It has been found that the utilization of more or less conventional frits (hereafter described) is practical where the glass article surface is at a temperature in excess of 500° F. and less than a temperature at which thermal deformation of the article will occur.

A more specific preferred range is from 700° F. to the upper limits of thermal stability or structural integrity of the formed article, e.g., about 1400° F. for usual container glass compositions or about 1700° F. or even greater for certain devitrifiable glass compositions. However, it should be realized that the effect of temperature is primarily dependent upon the temperature of the surface to which the coating particles are electrostatically attracted, for reasons to be hereafter more fully explained. Further, the specific temperature necessary is correlated with the properties of the particles to be deposited upon and fused on the hot surface of the article.

Further, while the maximum economic advantages are obtained by utilizing the residual heat of formation of the article, equally good results can be obtained, although at additional expense, by reheating the article to the desired temperature prior to performing the coating process of the present invention. Since the entire glass forming process, whether carried out by blowing a parison (as in the manufacture of containers), by pressing (as in the manufacture of ash trays, glass blocks or similar processes), or by drawing, rolling, casting or otherwise forming flat glass or glass sheets, is initially a controlled cooling operation by which the temperature of the glass is progressively decreased from a temperature sufficient to render the glass molten to a temperature sufficient to maintain the shape of the glass article, there is a substantial amount of residual heat remaining in any formed glass article at the completion of the forming cycle and with the glass at a temperature sufficient to maintain the shape and configuration of the formed article. In the case of containers, this temperature may well be on the order of from about 1000° F. to about 1400° F., and it is operationally feasible and commercially desirable to utilize this residual heat in the method of the present invention.

Inasmuch as the temperature of the surface to which the particles are to be applied is of far greater importance than the overall temperature of the article, this surface may be heated in any desired manner, as by flame heating, by radiant heating, induction heating, or in any other desired manner to elevate the temperature of the glass to a point at which the desirable results of the present invention can be obtained, as hereafter set forth in detail.

Of substantial importance to the method of the present invention is the thermal adherence of the particles to the glass or to one another after their electrostatic attraction thereto. This thermal adherence results in the substantial elimination of "rebound" of the particles, i.e., the tendency of the particles in the electrostatic field to pick up or assume the charge of the glass surface and to be reattracted to the carrier element or the other polar element of the field. The particles will then be redeposited upon the glass surface. This reattraction and redeposition of the articles will cause at least some of the particles to be angularly deflected from their original paths and to be finally deposited on the glass at a different location. Thus, where this rebound effect occurs, the clarity and sharpness of the image is substantially reduced and overall background coloration or coating is obtained.

It has been found that the particles are thermally adhered to the hot glass surface and to one another, so that a layer of particles of appreciable thickness can be firmly fixed to the surface without encountering any appreciable rebound effect.

Whether this fixing of the particles to the surface and to one another occurs because of actual melting of the particles or whether it is due to incipient fusion of the particles to the glass and to one another at relatively small areas of contact is unknown at the present time. However, the effects of thermal adherence can be readily observed in the increased sharpness and clarity of images formed by electrostatic attraction to hot glass surfaces. When this thermal adherence is coupled with electrostatic attraction of the particles, a strongly retained sharp image is uniformly obtained. The degree of overall adherence of the particles to the glass surface and to one another is dependent upon glass surface temperature, the composition of the particles of frit, the initial imposed electrical potential of the electrical field, etc.

THE CARRIER

Preferably, the particles are deposited upon the glass only after the particles have been disposed within areas having a desired configuration or formed into an image corresponding, either directly or inversely, to the image to be printed upon the hot glass surface.

This formation of the particles to the desired configuration or image is carried out by utilization of a carrier of one type or another. Further, this carrier may serve as one of the two electrically charged polar elements of the electrical field (the glass surface forming the other polar element). The carrier thus must be electrically conductive and capable of bearing, forming or at least retaining the particles to the desired image or configuration.

One form of carrier which may be suitably utilized and in a manner hereafter discussed in detail is a metallic plate formed of aluminum, anodized aluminum, steel or copper, for example. The particles are placed upon this metallic plate so as to be oriented thereon into the desired image. For example, it has been found that the particles may be deposited upon such a carrier plate by passing the particles through a stencil or screen apertured in accordance with the image to be ultimately formed. Such metallic plates and the method of the formation of the particles into images of the desired character are set forth in detail and fully described in the copending application of Kenneth Lusher, Ser. No. 242,229, filed Dec. 4, 1962 (now abandoned), and assigned to the assignee of the present application. Alternatively, the carrier may be a conductive screen or stencil having apertures defining areas corresponding to the image to be formed on the glass surface and through which the particles pass for transfer to the hot glass surface. This conductive screen or stencil becomes the one polar element defining the electrical field in conjunction with the glass surface forming the other polar element, and the particles in contact with the screen or stencil assume the charge of the screen or stencil and therefore are attracted to the glass surface which is oppositely charged.

An additional alternative carrier structure may be a metallic plate which actually forms a gravure element having recesses or pockets in the surface thereof which is filled with the particles, the remainder of the surface of the plate being free of such particles. This gravure plate forms one polar element defining the electrostatic field and imparts its charge to the particles, the particles being transferred from the pockets to the hot glass surface by the electrostatic field existing therebetween. The formation of the pockets in the gravure plate may be accomplished in any conventional manner, i.e., by engraving, etching or similar well known techniques.

These three types of carriers are specifically discussed hereinafter.

The shape and overall contour of the carrier may be varied as desired and as necessary to carry out the actual transfer or attraction steps for depositing the particles upon the hot glass surface. For example, the carrier may be of a contour conforming to the general contour of that part of the article that is to be decorated, printed or otherwise coated, i.e., a concave carrier may be utilized to retain or otherwise dispose particles for attraction to the convex surface portion or area of a bottle or container, while a flat carrier may be utilized for transferring particles to a flat glass surface. In contrast to this conformation of the carrier and the article, a flat carrier may be utilized for transfer to the convex surface of a glass container with the glass container being rolled or otherwise relatively moved across the flat carrier surface. Of course, the relative shapes and configuration of the carrier and the glass surface are susceptible to substantial variations over and above those above mentioned.

THE PRINTING PARTICLES

The printing particles of the present invention are frit particles, i.e., finely divided essentially glassy particles, commonly referred to by those skilled in the art as "ACL," i.e., Applied Colorant Lettering, particles or frits. Such particles are commonly formed as dual phase compositions, the compositions conventionally containing an essentially glassy or vitreous flux phase and a pigment or colorant phase. Generally incorporated in the flux are various opacifying agents, i.e. titanium dioxide, and fluxing agents or materials capable of imparting desired low melting point properties to the frit. The frit generally contains a high proportion of lead oxide and relatively low proportions of silicon dioxide, when compared with flint glass compositions, and the relative proportions of these ingredients, in combination with the finely divided particulate size of the frits, results in their fusion to a nonparticulate, glassy state at temperatures well below the deformation temperature of normal glass compositions.

Exemplary of such frit compositions are the compositions set forth hereinafter in Tables IV and V. The frit of Table IV has an essential blue coloration, resulting from the incorporation of cobalt oxide as a colorant, while the composition of Table V is of a white coloration. Both such compositions are commercially available.

TABLE IV

| Oxide: | Percent by weight |
|---|---|
| PbO | 43.0 |
| $SiO_2$ | 32.4 |
| $B_2O_3$ | 2.5 |
| $ZrF_4$ | 2.0 |
| $ZnO_2$ | 2.0 |
| BaO | 1.3 |
| $TiO_2$ | 1.0 |
| $Na_2O$ | 5.1 |
| $Co_3O_4$ | 10.6 |

TABLE V

| Oxide: | Percent by weight |
|---|---|
| Flux phase— | |
| PbO | 53.1 |
| $SiO_2$ | 27.3 |
| $B_2O_3$ | 5.9 |
| BaO | 1.5 |
| $TiO_2$ | 2.25 |
| $Na_2O$ | 2.15 |
| NaF | 2.20 |
| $ZrO_2$ | 4.0 |
| ZrO | 1.6 |
| Pigment phase— | |
| $TiO_2$ | 11 |

Of importance to the operability of the method of the present invention are the electrical properties of the colorant frits such as those set forth in Tables IV and V, particularly the bulk electrical resistivity of the glass frits. The resistivity of the frits was measured in a Pyrex glass test cell which provided a constant volume of material for comparison. The test cell was a ring with an 0.069 inch side wall which formed an internal cylinder 0.834 inch in diameter and 0.1 inch long. The cylinder was filled with the frit to be tested, and the excess material was doctored off. The indicated voltage was applied across the test cell and the current through the cell was measured at various voltages. The resistance was then calculated.

Table VI sets forth the resistivity of the glass frits at various applied potentials and at various particles sizes. The indicated particle sizes are nominal sizes and may well contain particles of a size less than the indicated minimum size for each gradation. The compositions for which the resistivity in Table VI as indicated were the compositions set forth in Tables IV and V, as indicated.

TABLE IV.—RESISTIVITY OF GLASS FRITS AT VARIOUS APPLIED POTENTIALS

| Frit | Resistivity (ohm-cm.) at Indicated Voltage | | | | | |
|---|---|---|---|---|---|---|
|  | 1.5 v. | 600 v. | 1 kv. | 2 kv. | 3 kv. | 4 kv. |
| Table IV (0–13 micron) | $3 \times 10^{10}$ | $1.8 \times 10^8$ | $1.8 \times 10^8$ | $1.1 \times 10^8$ | $7.6 \times 10^7$ | $10^6$ |
| R-660 (13–26 micron) | $2 \times 10^{10}$ | $4.1 \times 10^8$ | $2.8 \times 10^8$ | $2.1 \times 10^8$ | $1.7 \times 10^8$ | $1.5 \times 10^8$ |
| R-660 (26–40 micron) | $4 \times 10^{10}$ | $1.1 \times 10^9$ | $7 \times 10^8$ | $6.2 \times 10^8$ | $5.1 \times 10^8$ | $4.2 \times 10^8$ |
| R-660 (−250+325 mesh) | $4 \times 10^{10}$ | $1.1 \times 10^9$ | $7 \times 10^8$ | $6.2 \times 10^8$ | $6 \times 10^8$ | $5.3 \times 10^8$ |
| R-660 (−200+250 mesh) | $10^{10}$ |  |  |  |  |  |
| Table V white | $2 \times 10^{12}$ | $1.1 \times 10^9$ | $6 \times 10^8$ | $4.6 \times 10^8$ | $3.7 \times 10^8$ | $2.8 \times 10^8$ |

It has been found that desirable results are obtained with frits having a preferred bulk resistivity, measured in ohms-centimeters ranging from about $10^6$ to about $10^{10}$ at the electrical potentials indicated.

THE ELECTROSTATIC FIELD

As hereinbefore indicated the particles are attached to the hot glass surface by subjecting the particles to an electrostatic force resulting from the establishment of an electrostatic potential difference between the particles and the article surface.

Where the particles are formed to or present in the desired image or configuration upon a carrier, the electrostatic potential difference is established between the carrier and the hot glass surface. This electrostatic potential difference does not require that either the carrier and particles or ly well in most instances regardless of the specific polarity positive polarity. In other words, the method works equally well in most instances regardless of the specific polarity of the hot glass surface. In fact, desirable results can be obtained where the hot glass surface is merely connected to ground.

The intensity of the electrostatic field, measured in voltage, may range from 2,000 to 10,000 volts in a preferred embodiment of the method. However, intensities of less than 2,000 volts may be utilized under some conditions of minimum gap, maximum conductivity, or the like, and voltages of greater than 10,000 volts may be utilized under extreme conditions.

So far as the gap across which the attraction of the particles to the hot glass surface occurs is concerned, this gap may range from a minimum of zero (where the glass surface is in actual physical contact with the particles), to a gap of about ¼ inch. The size of the gap is variable in accordance with the operating conditions and is generally large enough to prevent a deleterious amount of arcing at the specific electrostatic field intensity or voltage and is small enough to prevent excessive dispersion or scattering of the particles during their attraction to the hot glass surface. Generally, the smaller the gap the greater the danger of arcing, although the temperature of the hot glass surface exerts some influence on arcing, and the danger of excessive scattering and loss of image fidelity or identity increases as the gap is increased.

THE SPECIFIC EMBODIMENT OF FIGURE 1

In that embodiment of the invention illustrated in FIGURE 1 of the drawings, reference numeral 10 refers generally to a glass article having a planar upper surface 11 which is hot, preferably at a temperature in excess of 500° F. The total article 10 may or may not be at this elevated temperature, as heretofore explained.

Superimposed over the surface 11 and generally parallel thereto is a metallic stencil or screen 12 having a plurality of apertures 13, these apertures cooperatively defining an image or pattern to be placed upon the surface 11. The stencil 12 may merely be a metallic sheet having apertures 13 punched or otherwise formed therein or, alternatively, the member 12 may be an electrically-conductive screen, such as a screen of metallic wire. Typically, good results have been obtained utilizing screen or stencil apertures on the order of from 0.0088 to 0.00092 inch on each side of a square opening. Superimposed upon the stencil element 12 is a layer of particles 14, the particles being of a glassy frit or the like, e.g., of a composition such as those set forth in Tables IV and V. The layer of particles 14 is retained upon the upper surface or upon the wires of the screen, if such is employed.

The glass article 10 is connected to one side of a high voltage source 15, as by a lead wire 16, while the other side of the high voltage source 15 is connected to the conductive plate 12 by a lead wire 17. When the high voltage source 15 is energized, there exists an electrostatic potential between the article 10 and the carrier or member 12 across a gap 18 between the confronting faces of the elements 10 and 12. Those particles 14 that are or become in contact with the element 12, necessarily assume the charge of the element 12 and will be electrostatically attracted to the surface 11 of the article 10 by the electrical field between the surface 11 and the element 12. To aid in displacing the particles 14 onto the surface 11, a brush or other particle-displacing means, indicated schematically at 20 is preferably utilized to mechanically urge the particles through the apertures 13.

In a specific example of the operation of the embodiment of the invention illustrated in FIGURE 1 of the drawings, a stencil was prepared utilizing a 325-mesh screen with wires 0.0012 inch in diameter spaced 0.0019 inch apart. Particles of a size normally corresponding from 13 to 26 microns were applied to the upper surface of the screen 12 and where brushed through the screen apertures 13 in the screen. The gap 18 was varied in accordance with the electrostatic field and suitable images were obtained at the surface 11 at a gap of 1/16 inch utilizing an electrostatic field voltage of about 3.5 kilovolts. Other suitable images were obtained utilizing a field having a strength of about 7 kilovolts and a gap of 1/8 inch. The quality of the printing was somewhat better utilizing the 1/16 inch gap than utilizing the 1/8 inch gap. The polarity of the voltage did not affect the printing materially, although the quality of the printing seemed to be improved by reversing the polarity of the voltage at occasional intervals.

The surface 11 was as a temperature of 1000° F., the entire article 10 being heated to this extent, and the particles electrostatically attracted to the surface 11 and deposited thereon, as at 19, were thermally adhered thereto by their contact with the hot surface 11, these particles being subsequently fused on the surface to form an adherent non-particulate coating upon subsequent heat treating through a heating schedule corresponding to a normal annealing cycle for the glass article 10.

THE SPECIFIC EMBODIMENT OF FIGURE 2

Figure 2:
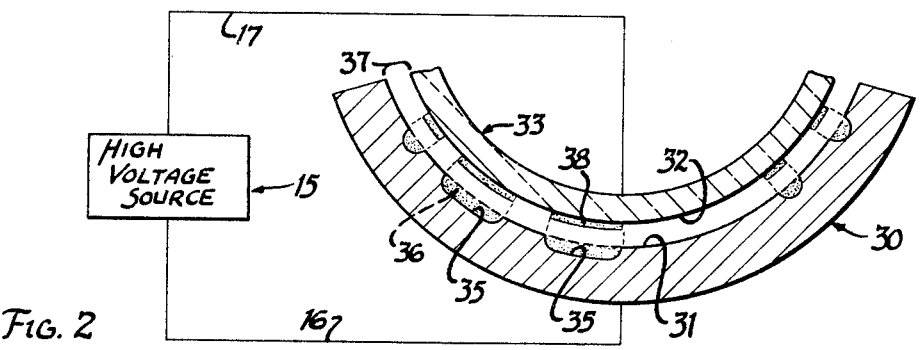
FIGURE 2 is a schematic representation similar to FIGURE 1 illustrating a modified form of apparatus.

In FIGURE 2, reference numeral 30 refers generally to a different form of electrically-conductive medium or carrier, the medium 30 being metallic and arcuate in general contour to conform generally at its inner concave face 31 with the exterior convex surface 32 of a bottle indicated generally at 33. The bottle 33 was of the specific composition set forth in Table II and was again heated.

The face 31 of the carrier 30 is etched or engraved by well known techniques to form a rotogravure image characterized by recesses or pockets 35 opening onto the surface 31 and recessed beneath the level of the surface. These pockets 35 were filled with frit particles indicated generally at 36, the particles being of the composition set forth in Tables IV and V. An electrostatic potential difference was impressed at the gap 37 between the bottle 33 and the arcuate plate 30 by a high voltage source 15 and lead lines 16 and 17 as above described, and particles from the recesses or pockets 35 were transferred to the surface 32 of the bottle 33 to form an effective image 38 on the convex surface 32.

Alternatively, the particles 36 in the pockets 35 can be charged by ion bombardment if desired. Ion charging can be accomplished by utilizing the corona from two stainless steel wires 0.005 inch in diameter, spaced one inch apart and 1/2 to 3/4 of an inch above the printing plate. Potentials of 10 to 15 kilovolts can be applied to the wires to produce corona in order to charge the frit particles 36 in the pockets 35 either positively or negatively. To aid in the retention of this charge upon the frits, the frits may be coated with an insulating material such as ethyl cellulose, a silicone fluid, or a similar insulating material.

In a specific example, the frits of Tables III and IV having nominal sizes of from 13 to 26 microns were disposed within cups or recesses 35 ranging from 0.03 inch to 0.25 inch in diameter and of from 5 to 30 mils in depth. The gap may range from 5 mils in width to a width of 1/8 inch or even greater with satisfactory attraction to the surface 32. The cups were filled by spreading the frit over the surface of the plate and the excess frit removed by doctoring the frit from the non-pocketed portions of the surface 31. Satisfactory prints were obtained onto the hot glass surface 32 at temperatures ranging from about 500° F. to 1000° F. and at electrical fields of from about 3.5 kilovolts to about 7.5 kilovolts, depending upon the size of the gap 37.

THE SPECIFIC EMBODIMENT OF FIGURE 3

Figure 3:
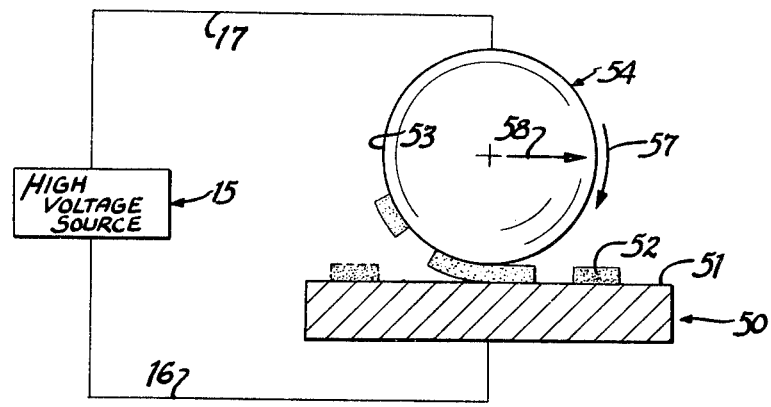
FIGURE 3 is a further modified form of apparatus also capable of carrying out the method of the present invention.

In FIGURE 3 of the drawings, reference numeral 50 refers generally to a metallic or other conductive plate having a planar upper surface 51 upon which are located a plurality of deposits of particles 52, these particles being oriented in a pattern or image corresponding to a mirror image of the pattern desired upon the exterior surface 53 of the bottle or similar glass article 54. The deposition of the particles 52 upon the surface 51 can be obtained in any desired manner, i.e., by means of a silk screen process, a photographic or xerographic process, or by any other desired means, particularly by means of the methods set forth in the above-identified copending Lusher application. Superimposed over the plate 50 is a bottle 54 which is of the composition set forth in Table II, and the frit compositions of substantially those set forth in Tables III and IV were utilized. The bottle, at a temperature in excess of 500° F., is rolled across the plate 50 with the bottle exterior surface 53 in actual physical contact with the exposed upper layers of the particles 52. The bottle 54 and the plate 50 were connected by suitable means, as by lead lines 16 and 17, to the opposite sides of a high voltage source 15 as hereinbefore set forth.

It will be noted that the bottle is moved relatively to the plate 50, the bottle periphery 53 traversing the surface of he plate 50 in contact with the particle so that the particles are electrostatically attracted onto the bottle surface 53. This rolling of the bottle actually constitutes a compound movement composed of rotational movement (indicated by reference numeral 57) and translatory motion of the axis of the bottle (indicated by the directional arrow 58).

In any event, satisfactory electrostatic transfer of the particles 52 was accomplished even though there was no actual gap existing between the bottle surface 53 and the particles 52 on the plate 50. Exemplary operating conditions include an applied voltage of 5 kilovolts, a glass surface temperature of from 450° F. to 1100° F., and particles of a nominal 13 to 26 microns and of the compositions of either Tables IV or V.

SUMMARY

From the examples and data heretofore given, it will be immediately appreciated that the present invention provides a new and novel method of decorating or printing a glass article.

Critical to the method of the present invention is the utilization of a bottle which is at a temperature sufficient to thermally adhere printing particles to the surface thereof and also at a temperature sufficient that the glass is so conductive as to accommodate its utilization as one of the poles of an electrostatic field.

While it is preferred that a temperature of at least 500° F. be utilized, it will be appreciated that this temperature is capable of substantial variation, dependent upon the specific composition of the glass article, the thermal stability of the particles being applied to the glass article and the susceptibility of the particles to thermal adherence to the surface. Actually, temperatures normally ranging from 700° F. to 1400° F. will be encountered where the maximum utility of the invention is obtained, namely by utilizing the residual heat of the glass article from the forming operation. However, it will be appreciated that these temperatures merely represent the desired embodiment of the invention.

Additionally, it will be appreciated that the temperatures defined for the glass articles are actually the temperatures of the surface to which the particles are to be applied and the entire article need not be heated. Thus, a localized area of the bottle may be subjected to heat by suitable means, as by induction heating, flame heating, radiant heating, or the like, particularly where the heated portion of the bottle is then made the polar contact for the electrostatic field.

The degree of thermal adherence of the particles to the hot surface of surface area is only that degree of adherence necessary to prevent rebound and to retain the particles on the surface until such time as the particle is firmly fused to the surface, preferably by a subsequent heat treatment which, in a preferred embodiment of the invention, anneals or otherwise treats the glass in a preferred manner.

Of course, where the surface is at a temperature of 1400° F. or the like, sufficient heat may be imparted to the particles to actually fuse the particles to one another and to the surface to a degree sufficient to form the final, adherent coating. Particularly is this true where a nonparticulate or smooth enamel-type coating is not required.

So far as the pattern of the particles is concerned, the particles preferably have the desired pattern imparted to them prior to their attraction to the glass surface, this pattern being imparted by passage of the particles through a conductive screen or the like (FIGURE 1), by the prior disposition of the particles in recesses defining the pattern (FIGURE 2), or by the deposition of the particles in the pattern upon the surface of a transfer medium (FIGURE 3). The particles may have this pattern applied thereto or the particles may be oriented in a pattern which is a mirror image of the pattern to appear upon the glass surface.

Further, it will be appreciated that particles of more than one coloration may be applied simultaneously to the glass surface by any of the methods illustrated in the drawings by the utilization of proper orientation means for the particles prior to their subjection to the electrostatic field. Such procedures are set forth in detail in the above-identified Lusher application. Alternatively, successive layers of particles may be applied to obtain multicolored effects, the colors being applied in series by the utilization of successive carriers bearing the different colors, respectively.

I claim:

1. The method for the electrostatic decoration of glass which comprises projecting a finely divided glass color through an electrostatically charged foraminous metal member constituting a desired design in perforations adapted to electrically charge said glass color, onto a spaced oppositely charged glass article to be decorated having a sufficiently high temperature to cause said glass color to be fused thereon, whereby said glass article may be formed and decorated with a glass color by a single annealing operation.

2. The method for the electrostatic decoration of glass which comprises projecting a finely divided glass color through an electrostatically charged foraminous metal member constituting a desired design in perforations adapted to electrically charge said glass color, onto a spaced oppositely charged glass article to be decorated having a temperature in excess of 400° C., fusing said glass color to the desired smoothness, whereby said glass article may be formed and decorated with a glass color by a single annealing operation.

3. The method for the electrostatic decoration of glass which comprises positioning a foraminous metal member constituting a desired design in perforations adapted to electrically charge glass color particles when said member is electrically charged and said particles are moved therethrough, at a distance of about $\frac{1}{16}$ inch to $\frac{1}{4}$ inch from a glass articles having a sufficiently high temperature to cause the fusing of a finely divided glass color on the surface thereof, charging said member and glass article with opposite electrostatic charges of sufficient voltage to cause glass color particles to be projected in a straight line from said member to said glass article, moving finely divided glass color particles through said member toward said glass article whereby said particles are projected on said hot glass surface and caused to be fused thereon, whereby said glass article may be formed and decorated with a glass color by a single annealing operation.

4. The method for the electrostatic decoration of glass which comprises positioning a foraminous metal member constituting a desired design in perforations adapted to electrically charge glass color particles when said member is electrically charged and said particles are moved therethrough, at a distance of about $\frac{1}{16}$ inch to $\frac{1}{4}$ inch from a glass article having a temperature in excess of 400° C., charging said member and glass article with opposite electrostatic charges of between 2,000 and 7,000 volts and of sufficient force to project finely divided glass color particles in a straight line from said member to said glass article, moving finely divided glass color particles through said member toward said glass article whereby said particles are projected on said hot glass surface, causing said particles to be fused to the surface of said glass, whereby said glass article may be formed and decorated with a glass color by a single annealing operation.

5. In a method of printing a decorative image upon the exterior surface of a glass article while the article surface is still at a temperature of 500° F. or more from residual heat of the article forming process; the improvement comprising the steps of arranging a supply of colorant frit particles for transfer to the article surface in a pattern conforming to that of the desired image by the interposition of a screen having image defining apertures therethrough between a loose pile of said particles and the surface of the glass article, juxtaposing the surface of the heated glass article to be decorated and the frit supply, electrically charging the frit particles, and electrically connecting the heated glass article to a high voltage source to establish an electric field operable to attract the charged frit particles to the heated surface of said article while the surface of the article is residually heated to a temperature high enough to thermally adhere the electrically transferred frit particles thereto.

6. In a method of printing a decorative image upon the exterior surface of a glass article while the article surface is still at a temperature of 500° F. or more from residual heat from the article forming process; the improvement comprising the steps of supporting a supply of colorant frit particles of predetermined size upon a screen having image defining apertures therethrough of a size sufficient to normally retain the frit particles against passage therethrough, locating the surface of the heated glass article to be decorated adjacent the side of said screen opposite that upon which the particles are supported, electrically charging the frit particles, and simultaneously connecting the heated glass article to a high voltage source to establish an electric field operable to attract the charge frit particles to the heated surface of the article and mechanically brushing the supply of particles against the screen to express particles through the image defining openings therein for electrical attraction to the surface of said article while said article is residually heated to a temperature high enough to thermally adhere the electrically transferred frit particles thereto.

7. In a method as defined in claim 6, the further improvement wherein said screen is of electrically conductive material and the step of charging said particles includes the step of connecting said screen to one terminal of the high voltage source, the hot glass article being connected to the opposite terminal of the high voltage source.

(References on following page)

References Cited

UNITED STATES PATENTS

| | | | |
|---|---|---|---|
| 398,995 | 3/1889 | Atterbury | 117—18 X |
| 839,187 | 12/1906 | Norton | 117—25 |
| 2,067,949 | 1/1937 | Rez | 65—60 |
| 2,152,077 | 3/1939 | Meston et al. | 117—17.5 |
| 2,162,317 | 6/1939 | Rez | 117—23 X |
| 2,433,116 | 12/1947 | Greenbowe et al. | 65—60 |
| 2,502,758 | 4/1950 | Short | 65—60 X |
| 2,571,608 | 10/1951 | Plagge | 117—17 X |
| 2,787,556 | 4/1957 | Haas | 117—17.5 |
| 2,940,864 | 6/1960 | Watson | 117—17 |
| 3,058,443 | 10/1962 | Paton | 117—17 X |
| 3,063,859 | 11/1962 | Heckscher | 117—17.5 |
| 3,071,070 | 1/1963 | Matthews et al. | 117—17.5 |
| 3,081,699 | 3/1963 | Gulko | 117—17.5 |

OTHER REFERENCES

Oughton, C. D.: "Decoration of Glass and Ceramic Articles by Xerography," Glass Industry, pp. 662–64, December 1949.

Schaffert, R. M., and Oughton, C. D.: "Xerography: A New Principle of Photography and Graphic Reproduction," J. Opt. Soc. Am., vol. 38, pp. 991–8, December 1948.

MURRAY KATZ, Primary Examiner

E. J. CABIC, Assistant Examiner

U.S. Cl. X.R.

65—60; 101—35, 426; 117—17.5, 18, 23, 125, 229

PO-1050
(5/69)

UNITED STATES PATENT OFFICE
CERTIFICATE OF CORRECTION

Patent No. 3,502,022        Dated March 24, 1970

Inventor(s)      W. H. Wood

It is certified that error appears in the above-identified patent and that said Letters Patent are hereby corrected as shown below:

Column 2, following line 5, insert -- glass surface after their transfer thereto, thus substantially--

Column 3, line 24, change "expalined" to --explained--

Column 7, line 50, change "IV" to --VI-- in table VI, the column headed "600 v.", change the first entry from "$1.8 \times 10^8$" to --$1.4 \times 10^8$-- line 66, change "attached" to --attracted--

Column 8, delete line 1 and substitute therefor --that the hot glass surface be of either specific negative or--

Column 10, line 35, change "he" to --the--

Column 11 (Claim 3), line 73, change "articles" to --article--

SIGNED AND
SEALED
AUG 11 1970

(SEAL)
Attest:

Edward M. Fletcher, Jr.
Attesting Officer

WILLIAM E. SCHUYLER, JR.
Commissioner of Patents